Patented Dec. 1, 1953

2,661,364

UNITED STATES PATENT OFFICE 2,661,364

PREPARATION OF ORGANIC PHOSPHORUS COMPOUNDS, AND IN PARTICULAR, OF DIALKYL PHOSPHITES

Maurice Leon Ernsberger and Julian Werner Hill, Wilmington, Del., assignors to E. I. du Pont de Nemours & Company, Wilmington, Del., a corporation of Delaware No Drawing. Application January 14, 1950, Serial No. 138,709

6 Claims. (Cl. 260—461)

This invention relates to an improved method for preparing organic phosphorus compounds.

The methods hitherto known for preparing organic phosphorus compounds involve certain difficulties which make them undesirable from a practical standpoint. Thus in the preparation of dialkyl phosphites by the reaction of alcohols with phosphorus trichloride provision has to be made for handling the hydrogen chloride formed as a by-product; furthermore, some of the alcohol reacts to form the alkyl chloride and is lost. Likewise, in the preparation of dialkyl phosphites by the reaction of alcohols with phosphorus trioxide, the phosphorus trioxide itself is not easy to prepare and to purify to the necessary degree for use in reactions with alcohols.

This invention has as an object a simple, direct method for preparing dialkyl phosphites and other organic phosphorus compounds. Other objects will appear hereinafter.

These objects are accomplished by the present invention wherein a monomeric organic compound which is free from aliphatic unsaturation and which is hydrocarbon except for one or more hydroxyl groups is reacted with oxygen and white phosphorus. Because of the ease of reaction, the relatively easy isolation of the products and their importance in the general field of organic chemistry, this process is especially suitable for the preparation of dialkyl phosphites by the interaction of oxygen, white phosphorus, and a primary or secondary alkanol, i. e., an alkanol having hydrogen on carbinol carbon.

The process of this invention is preferably carried out by introducing oxygen into a well-agitated mixture of white phosphorus, i. e., the white or yellow allotropic form of elementary phosphorus, and the monomeric saturated alcohol in the liquid state. An excess of the alcohol over the amount stoichiometrically equivalent to the phosphorus is conveniently employed, the excess serving as a medium for the reaction. If desired, an inert solvent or diluent such as benzene can be employed, and in this case a smaller excess of alcohol is used. Oxygen is introduced at such a rate that the resulting exothermic reaction can be controlled to produce a reaction temperature of between 25° and 150° C., preferably 40° to 75° C. During the first stage of the reaction the oxygen is consumed as rapidly as it is added, but in the later stages the reaction slows down and an excess of oxygen is present in the reaction mixture. The reaction is continued until there is no further liberation of heat. In most cases a clear, colorless solution is obtained. Periods of time ranging from five to thirty hours are usually sufficient. The exact time of reaction depends on the particular reactive saturated monomeric alcohol and the particular reaction temperature employed. If the amount of heat evolved from the reaction is not sufficient to heat the reaction mixture at the desired temperature, external heat can be applied in order to speed up the reaction. Reaction temperatures of 50° to 75° C. are especially suitable. The products of this reaction are isolated from the reaction mixture by conventional methods. Those products stable to moderate heat are conveniently isolated by fractional distillation. However, some of the dialkyl phosphites, especially those derived from secondary and tertiary alcohols, are unstable and decompose on distillation. Such unstable compounds can be used for some purposes without isolation from the reaction mixture.

The process of this invention is illustrated further by the following examples in which the proportions of ingredients are expressed in parts by weight unless otherwise noted.

EXAMPLE I

A reaction vessel fitted with a mechanical stirrer, reflux condenser and an inlet tube for oxygen is charged with 115 parts of absolute ethyl alcohol and 20 parts of white phosphorus which has previously been cut into small pieces and washed three times with absolute ethyl alcohol. The mixture is stirred and oxygen is bubbled in through the inlet tube, heat being evolved and the reaction temperature rising to 50° to 60° C. At first the reaction mixture is a cloudy yellow color, but it becomes clear and colorless after seven hours. Distillation of the reaction mixture gives 62.8 parts of recovered ethyl alcohol, 34.5 parts of crude diethyl phosphite and 28 parts of a residue. The crude diethyl phosphite is redistilled, and there is obtained 22.4 parts of diethyl phosphite boiling at 79.5–80.5° C./19 mm., and having a refractive index, $n_D^{26.3}$, of 1.4051.

Analysis

Calculated for $C_4H_{11}O_3P$: P, 22.3%.
Found: P, 22.71%.

EXAMPLE II

A reaction vessel of the type used in Example I is charged with 130 parts of n-butyl alcohol and 10 parts of white phosphorus. Oxygen is introduced with stirring as in Example I and the reaction continued for about twenty hours. Very careful control of the oxygen input is required to maintain the reaction temperature at the desired point, 50° to 60° C. By distillation of the reaction product there are obtained 91 parts of butyl alcohol and 34.9 parts of crude dibutyl phosphite boiling at 123–127° C./18–21 mm. Redistillation of the product yields 24.9 parts of di-n-butyl phosphite boiling at 76–78° C./1.2 mm., and having a refractive index, $n_D^{29}$, of 1.4211.

*Analysis*

Calculated for $C_8H_{19}O_3P$: P, 16.0%.
Found: P, 16.16%.

EXAMPLE III

A reaction vessel having a bell-shaped mechanical stirrer, an oxygen inlet tube, and a reflux condenser is charged with 10 parts of white phosphorus and 130 parts of n-propyl alcohol. Oxygen is passed into the rapidly stirred mixture for ten hours, with external heat being applied as needed to maintain the temperature at 55–60° C. The flow of oxygen is then continued for an additional three hours at room temperature. The colorless, clear reaction mixture is then distilled. There are obtained 117.2 parts of recovered propyl alcohol and 17.5 parts of di-n-propyl phosphite boiling at 85.5°–87° C./6.5–7 mm. and having a refractive index, $n_D^{28.1}$, of 1.4148.

*Analysis*

Calculated for $C_6H_{15}O_3P$: C, 43.4%; H, 9.04%; P, 18.65%.
Found: C, 43.97%, 43.94%; H, 9.43%, 9.70%; P, 17.88%, 18.01%.

EXAMPLE IV

A reaction vessel of the type used in Example III is charged with 157.8 parts of isopropyl alcohol and 20 parts of white phosphorus. The reaction mixture is heated to 40° C. and oxygen is then introduced with stirring as described in Example I and the external source of heat removed. The reaction is continued for approximately seven hours varying the oxygen input rate and occasionally applying heat to the reaction vessel in order to maintain the temperature of the reaction mixture between aproximately 60 and 70° C. No further heat is applied to the reaction vessel, but the flow of oxygen is then continued for approximately an additional fifteen hours. The clear, colorless reaction mixture containing a very small quantity of a yellow solid is filtered and the filtrate fractionated by precision distillation under reduced pressure. There are obtained 78.9 parts of recovered isopropyl alcohol and 14.2 parts of diisopropyl phosphite boiling at 72–74° C./12–15 mm. exhibiting a refractive index, $n_D^{27}$, of 1.4040.

*Analysis*

Calculated for $C_6H_{15}O_3P$: P, 18.67%; C, 43.4%; H, 9.04%.
Found: P, 18.70%; C, 43.44%; H, 9.38%.

EXAMPLE V

A reaction vessel of the type used in Example III is charged with 75 parts of n-hexyl alcohol, 10 parts of white phosphorus and 66 parts of benzene. Oxygen is introduced into the reaction mixture with stirring as described in Example I over a period of nine hours while maintaining the temperature at 30–45° C. The reaction mixture is extracted with water, thereby removing the phosphorous acid. The clear, upper layer is separated and heated gently under reduced pressure to remove residual traces of water and unreacted n-hexyl alcohol. There is thus obtained as a residue di-n-hexyl phosphite, a clear, yellow liquid having a refractive index, $n_D^{25.1}$, of 1.4336.

*Analysis*

Calculated for $C_{12}H_{27}O_3P$: P, 12.40%.
Found: P, 12.39%.

The examples have illustrated the process of this invention with particular reference to reaction of certain alcohols with phosphorus and oxygen. However, other monomeric, saturated, organic alcohols, hydrocarbon except for one or more hydroxyl groups, may be substituted for these particular compounds. Thus the use of methyl, isobutyl, n-octyl, and n-dodecyl alcohols in the reaction give the corresponding dimethyl, diisobutyl, di-n-octyl, and di-n-dodecyl phosphites. Specific examples of other saturated monomeric compounds which can be used include polyhydric alcohols, e. g., ethylene and hexamethylene glycols; aromatic substituted aliphatic alcohols, e. g., benzyl alcohol; and cycloaliphatic alcohols, e. g., cyclohexanol.

Thus, the hydrocarbon radical previously referred to in the description of the alcohols usable in the process of this invention can be alkyl, aralkyl, and cycloalkyl in nature.

The products obtained by the process of this invention are useful as chemical intermediates and in other applications. The dialkyl phosphites are especially useful as chemical intermediates. For example, they can be added to olefins as described in U. S. application Serial No. 64,698, filed December 10, 1948, by Lipscomb and McGrew. The dialkyl phosphites are also useful as solvents and as stabilizing agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of alkyl phosphites wherein white phosphorus and oxygen are reacted at 40–75° C. with a primary alkanol.

2. A process for the preparation of alkyl phosphites wherein white phosphorus and oxygen are reacted at 40–75° C. with an alkanol having hydrogen on carbinol carbon.

3. A process for the preparation of alkyl phosphites wherein white phosphorus and oxygen are reacted at 40–75° C. with an alkanol.

4. A process for the preparation of alkyl phosphites wherein white phosphorus and oxygen are reacted at 40–75° C. with a saturated organic hydroxyl compound having only hydrocarbon and hydroxyl radicals.

5. A process for the preparation of alkyl phosphites wherein white phosphorus and oxygen are reacted at 50–75° C. with ethanol.

6. A process for the preparation of organic compounds of phosphorus wherein white phosphorus and oxygen are reacted at a temperature within the range 25–150° C. with an organic compound free from aliphatic carbon-carbon unsaturation and hydrocarbon except for at least one alcoholic hydroxyl group.

MAURICE LEON ERNSBERGER.
JULIAN WERNER HILL.

References Cited in the file of this patent

Thorpe, J. Chem. Soc., vol. 57, pages 634–636 (1890).

Ephraim, Inorganic Chemistry, edited by Thorpe et al. (4th ed., 1943), page 706.